US008412803B1

(12) United States Patent
Fraley

(10) Patent No.: US 8,412,803 B1
(45) Date of Patent: Apr. 2, 2013

(54) RESCUE CONFIGURATION

(75) Inventor: Paul Fraley, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 2373 days.

(21) Appl. No.: 10/666,352

(22) Filed: Sep. 19, 2003

(51) Int. Cl.
*G06F 15/177* (2006.01)

(52) U.S. Cl. .......................................... 709/220; 710/10

(58) Field of Classification Search .................. 709/220; 710/10
See application file for complete search history.

(56) References Cited

U.S. PATENT DOCUMENTS

| 5,745,669 | A  | * | 4/1998  | Hugard et al. ................... 714/3 |
| 6,167,494 | A  | * | 12/2000 | Cheston et al. ............... 711/162 |
| 6,529,966 | B1 |   | 3/2003  | Willman et al. |
| 6,543,004 | B1 | * | 4/2003  | Cagle et al. ..................... 714/15 |
| 6,718,463 | B1 | * | 4/2004  | Malik ............................... 713/2 |
| 6,931,523 | B1 | * | 8/2005  | Tomoson et al. ............. 713/100 |
| 7,073,053 | B1 | * | 7/2006  | Oz et al. ........................... 713/2 |

* cited by examiner

*Primary Examiner* — Thomas Dailey

(74) *Attorney, Agent, or Firm* — John C. Pokotylo; Straub & Pokotylo

(57) ABSTRACT

A configuration is identified as a rescue configuration. The identified rescue configuration is stored in a storage device (if it is not already stored). The stored rescue configuration may then be used to configure an apparatus, such as a router, in response to a rescue command. Identifying a particular configuration as a rescue configuration can be done by a manual command. The identifying may be limited such that it is effected only if performed by an authorized user. Alternatively, the identification of a configuration as the rescue configuration can be done automatically. For example, an automatic rollback to a known functioning configuration can occur automatically (e.g., in response to a rescue command). A configuration may be determined to be the known functioning configuration using various factors.

8 Claims, 6 Drawing Sheets

RESCUE CONFIGURATION

§1. BACKGROUND OF THE INVENTION

§1.1 Field of the Invention

The invention concerns configuration information used in apparatus, such as routers for example. More specifically, the invention concerns identifying and using a particular configuration for reset of the apparatus.

§1.2 Related Art

The description of art in this section is not, and should not be interpreted to be, an admission that such art is prior art to the invention. The invention may be used for marking configuration information to be used by a device or apparatus during a reset operation.

Data forwarding apparatus, such as routers and switches, may be interconnected to form networks. Each data forwarding apparatus may have a plurality of input lines and a plurality of output lines. A basic function of these apparatus is to forward data received at their input lines to the appropriate output lines. Routers, for example, may determine the appropriate output lines based on a destination address contained in the received data. Switches may be configured so that data received at input lines are provided to appropriate output lines.

Such data forwarding apparatus may need to be configured. This may be done by entering configuration commands, through a keyboard or some other type of interface, into a data forwarding device. For example, a command line user interface ("CLI") may be provided for configuring the apparatus. Other types of information or commands may also be entered into the apparatus through the keyboard or interface.

As data forwarding apparatus become more complex and perform more functions, the size and complexity of configuration information or the apparatus increase. The additional size and complexity increases the chances that an operator will introduce unintended errors or undesired operational characteristics into the configuration when changing the configuration. This complexity can also make it more difficult to restore the data forwarding apparatus if the configuration is lost or is corrupted.

Some data forwarding apparatus facilitate sophisticated configuration editing and storing operations. For example, a candidate configuration can be stored on a non-persistent storage device (e.g., RAM) and edited using a CLI. The edited version of the configuration can be stored on a persistent storage device (e.g., non-volatile RAM, or "NV RAM") using a "commit" command. Indeed, a number of alternative configurations can be committed and stored to NV RAM. The most recently committed configuration is used by the data forwarding apparatus. The most recently committed configuration is also used if the data forwarding apparatus is rebooted (i.e., if the data forwarding apparatus is restarted by reloading its operating system and configuration). Different versions of previously committed configurations can be made to be the most recently committed configuration by using a "rollback" command followed by a "commit" command.

As can be appreciated from the foregoing, data forwarding apparatus may have user interface tools to aid knowledgeable users in developing customized configurations. Unfortunately, however, data forwarding apparatus are often deployed at locations where such knowledgeable users aren't available. For example, a network service provider might configure and/or maintain data forwarding apparatus located at the premises of their customers. Such data forwarding apparatus and other equipment are commonly referred to as customer premise equipment ("CPE"). As another example, a company might configure data forwarding apparatus at a central location using highly trained, experienced staff. If a configuration is lost or corrupted, less experienced users might not be able to load a configuration that will allow the data forwarding apparatus to start functioning properly, or might not be comfortable with doing so.

In some instances, it may be possible for an experienced entity, such as a service provider or a highly trained user, to address the problem remotely. For example, a proper configuration may be uploaded to the data forwarding apparatus. However, there may be some instances in which the configuration is so corrupted that such remote diagnosis, repair, or both isn't possible or practical. This is especially true when the service provider's management link to the data forwarding apparatus is down because of the configuration corruption. Another alternative is to have an experienced user walk a less experienced user through a number of steps, for example over the telephone or via e-mail. However, attempting to diagnose the problem, fix the problem, or both in this way may be extremely difficult due to the complexity of some problems. Moreover, e-mail help might not be an option if the data forwarding apparatus is responsible for forwarding e-mail and cannot do so in its corrupted state. Consequently, the data forwarding apparatus may simply have to be shut down or continue operating in compromised manner until an experienced person can visit the site and address the problem.

Some data forwarding apparatus have a reset command for emergency situations. The reset command may be initiated via a user interface such as a CLI, a button, or a switch. The reset command may operate to restore a default configuration provided at the factory. Unfortunately, however, such factory defaults are often a poor substitute for configurations developed by service providers or in-house, highly trained and experienced users. In some instances, data forwarding apparatus reset with a factory default configuration might not function well, if at all.

Accordingly, there is a need to provide a better way to permit a user to get a data forwarding apparatus with a lost or corrupted configuration back to a good configuration.

§2. SUMMARY OF THE INVENTION

The invention describes methods and apparatus that meet the needs introduced above. For example, the invention describes methods and apparatus for (1) identifying or marking a configuration as a rescue configuration, (2) storing the identified rescue configuration (if it is not already stored), and/or (3) selecting a stored rescue configuration to use as a most recently committed configuration in a data forwarding apparatus after a rescue input (e.g., a rescue command).

Identifying a particular configuration as the rescue configuration can be done by a manual command. Such identification may be limited such that the command may only be performed by an authorized user.

Alternatively, the identification of a configuration as the rescue configuration can be done automatically. For example, a rollback to a known functioning configuration (automatically used as a rescue configuration) can occur in response to a rescue command. A configuration may be determined to be the known functioning configuration (which may be used as a rescue configuration) using one or more of various factors such as (1) length of time the configuration was used, (2) length of time of continuous use of the configuration, (3) use of the configuration for forwarding a predetermined number of datagrams, (4) use of the configuration for supporting a predetermined number of sessions, (5) some configuration usage per outage ratio, (6) some configuration usage per error ratio, etc.

A most recently committed configuration (which may be different than the rescue configuration) may still be used upon reboot (as opposed to a "rescue").

Each of the foregoing methods may be performed by executing machine-executable instructions stored on a machine-readable medium, such as a storage facility of a data forwarding apparatus for example. Thus, each of the foregoing methods may be performed on a data forwarding apparatus. If the data forwarding apparatus includes interfaces for receiving and transmitting data, then the configuration information may include statements to configure the interfaces. If the data forwarding apparatus includes a routing facility, then the configuration information may include statements to configure the routing facility. An apparatus may include a single device, or multiple, perhaps distributed, devices.

§3. BRIEF DESCRIPTION OF THE DRAWINGS

§4. DETAILED DESCRIPTION

Elements, apparatus, systems, computer-implemented code, data structures and methods consistent with the principles of the invention provide a way to configure an apparatus. In one embodiment, the apparatus may be configured by (1) identifying a configuration as a rescue configuration, (2) storing the identified rescue configuration in a storage device (if it is not already stored), and (3) selecting a stored rescue configuration to use as a most recently committed configuration in a data forwarding apparatus (e.g., by committing it as a part of the rescue operation of the router) after a rescue command. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the principles of the invention are not intended to be limited to the embodiments shown and the inventor regards his invention as the principles embodied in the following disclosed methods, apparatus and data structures and any other patentable subject matter.

The invention discloses techniques that facilitate a simple reset to a presumed valid configuration, which configuration may be one other than a factory installed default configuration.

§4.1 Exemplary Environments in which the Present Invention May Operate

The invention may be used in or with apparatus in a network, such as data forwarding apparatus. Two exemplary data forwarding apparatus are introduced in §§4.1.1 and 4.1.2.

§4.1.1 First Exemplary Data Forwarding Apparatus

Figure 1:
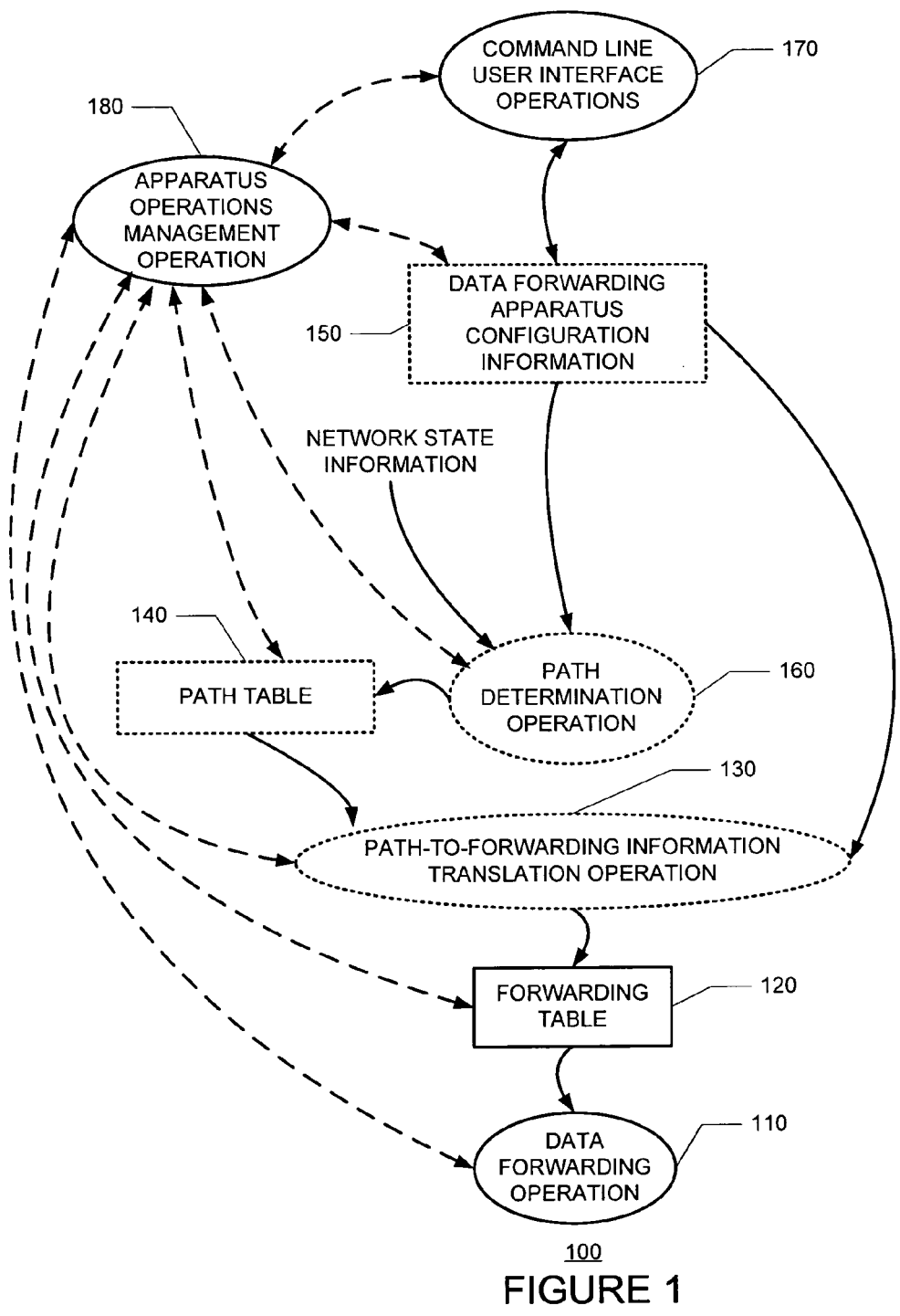
FIG. 1 illustrates an exemplary data forwarding apparatus with which the invention may be used.

FIG. 1 illustrates an exemplary data forwarding device 100. As shown, a data forwarding operation 110 may use information in a forwarding table 120 to forward incoming data (e.g., packets) towards a final destination. For a simple data forwarding device, only these components are needed. In many data forwarding devices, however, forwarding table 120 may be generated and updated by an optional path-to-forwarding information translation operation 130. Path-to-forwarding information translation operation 130 may perform its generation and update functions based on an optional path table 140 and apparatus configuration information 150. In one embodiment, path table 140 comprises a routing table. Path table 140 may be generated by an optional path determination operation 160 based on network state information (e.g., link state information) as well as apparatus configuration information 150. For example, path determination operation 160 may operate in accordance with known routing protocols to populate a routing table.

An apparatus operations management operation 180 may directly or indirectly interact with and manage some or all of the operations indicated in FIG. 1 by dashed arrow lines. The apparatus may be a single device, or may include multiple, perhaps distributed, devices.

§4.1.2 Second Exemplary Data Forwarding Apparatus

Figure 2:
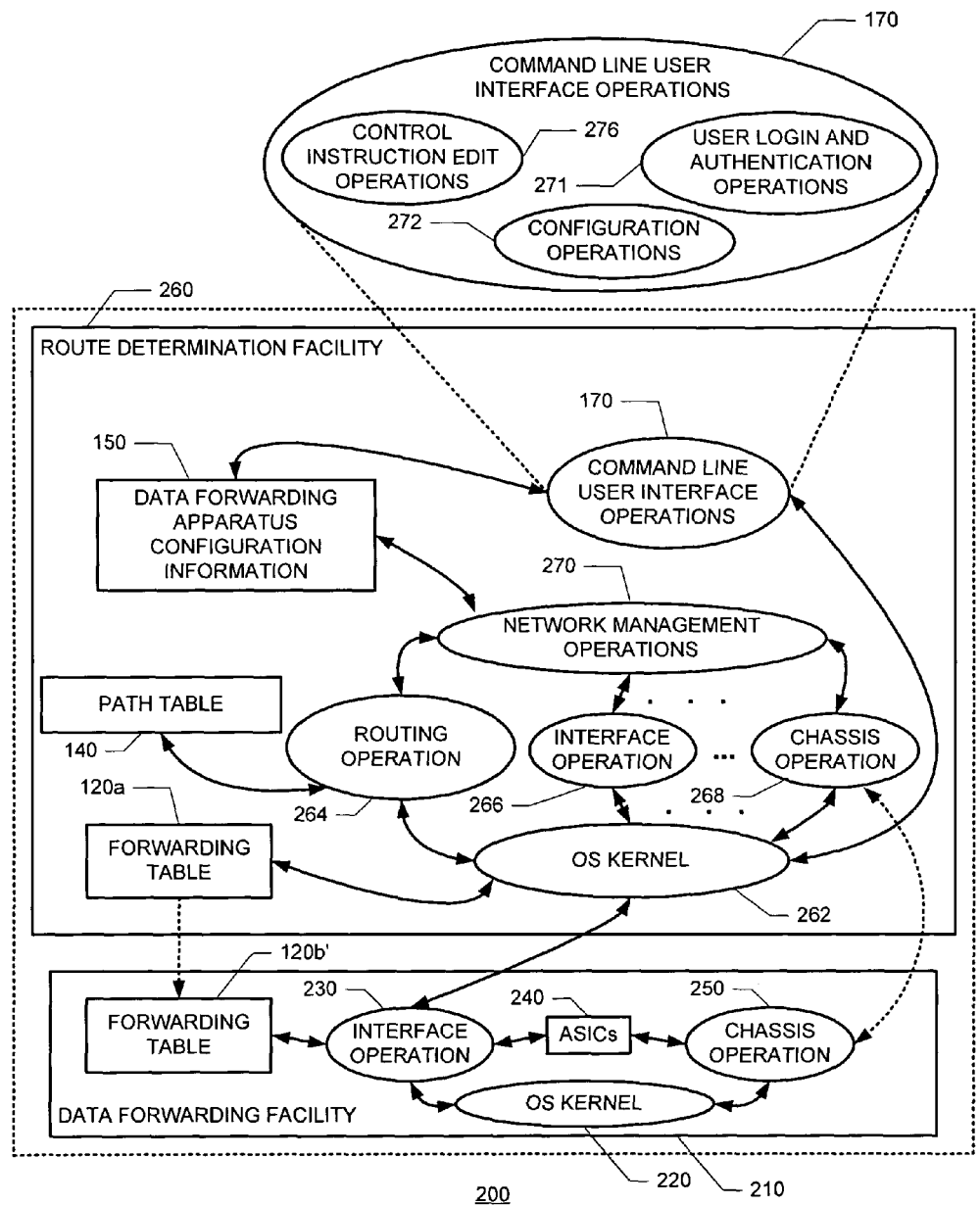
FIG. 2 illustrates an exemplary data forwarding apparatus with which the invention may be used.

FIG. 2 illustrates an exemplary data forwarding device 200. Data forwarding device 200 may include a data (e.g., packet) forwarding facility 210 and a path (e.g., route) determination facility 260. Basically, data forwarding facility 210 may function to forward data towards its ultimate destination, and path determination facility 260 may function to generate and/or update a forwarding table 120a based on path determinations.

In an exemplary embodiment, data forwarding facility 210 may include an operating system (OS) kernel 220 which supports various operations such as an interface operation 230 and a chassis operation 250. Exemplary data forwarding facility 210 may also include an instance of a forwarding table 120b used to forward data towards its destination. Forwarding table instance 120b may correspond to an instance of forwarding table 120a of path determination facility 260.

In an exemplary embodiment, path determination facility 260 may include an OS kernel 262 which supports various operations, such as a path determination operation 264, an interface operation 266, a chassis operation 268, CLI operations 170, and others, and which may be used to generate forwarding table 120a. Path determination operation 264 may be used to determine a path table 140. Network management, such as SNMP operations 270 may interact with the various operations 264,266,268 supported by the operating system kernel 262. CLI operation 170 may act on configuration information 150 and may interact with OS kernel 262.

CLI operations 170 in FIG. 2 may include user login and authentication operations 271, configuration operations 272 and control instruction editing operations 276. The apparatus may be a single device, or may include multiple, perhaps distributed, devices.

§4.2 Utility

The invention may operate to permit a forwarding apparatus, such as a router, to be reset to a previous configuration (which may be, but is not necessarily, a default configuration set at the factory) in a simple manner.

§4.3 Exemplary Embodiments

§4.3.1 Exemplary Operations

Figure 3:
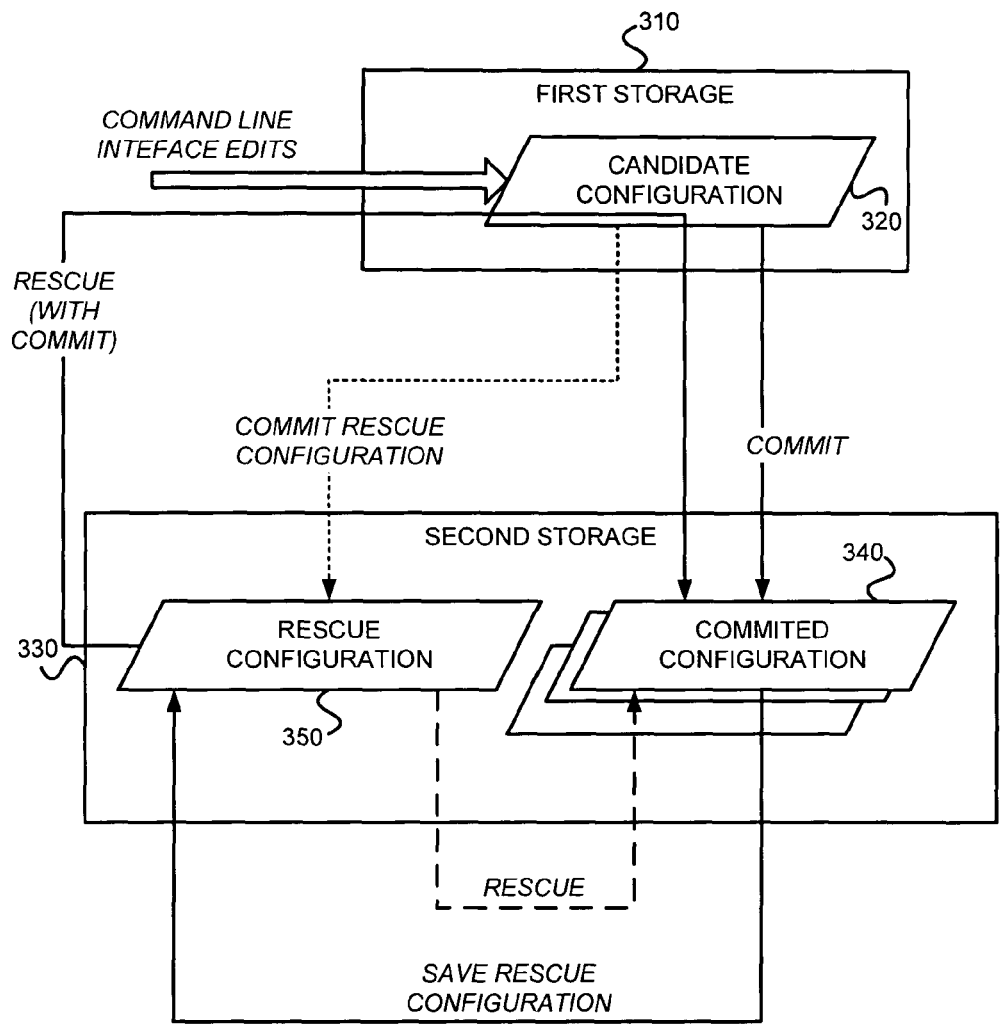
FIG. 3 illustrates operations that may be used in a manner consistent with principles of the invention.

FIG. 3 illustrates operations that may be used in a manner consistent with principles of the invention. First storage (e.g., RAM) 310 stores an instance of a current configuration 320. A user, such as an authorized user for example, may edit current configuration 320 using, for example a CLI. If the user enters a "commit" command, the current configuration is stored in second storage 330 as a committed configuration 340. The data forwarding device, as well as its components, operate in accordance with committed configuration 340. Upon system reboot, the committed configuration 340 is used. In a device in which more than one committed configuration may be stored, the most recently committed configuration may be used. In one embodiment, the first storage 310 may be non-persistent storage, while second storage 330 may be persistent storage (e.g., NV RAM).

If the committed configuration is lost or becomes corrupted (through user actions or otherwise), a rescue command may cause a rescue configuration 350 (e.g., a known functioning configuration) to be loaded for use as the most recently committed configuration. This loading of the rescue configuration 350 as the most recently committed configuration can occur directly (as indicated by the dashed line between elements 350 and 340)), or the rescue configuration 350 may first be loaded as a candidate configuration 320 and then loaded as a most recently committed configuration 340 (as indicated by the solid line from element 350 to 340, passing through 320). In this alternative, although steps corresponding to two commands (load and commit) may be performed, they may be effected by a single command. The previous most recently committed configuration may be saved by a revision control function of the apparatus.

Rescue configuration 350 may be identified as such by a manually entered user command, or may be determined automatically (e.g., heuristically). In the first case, in response to a "save rescue configuration" command, a committed configuration 340 (such as a most recently committed configuration) may be loaded as the rescue configuration 350 (as indicated by the solid line between elements 340 and 350). Alternatively, in response to a "commit rescue configuration" command, a candidate configuration 320 may be loaded as the rescue configuration 350 (as indicated by the dotted line between elements 320 and 350). In another alternative (not shown), a previously committed (e.g., archived) configuration may be identified as the rescue configuration. In this alternative, even though some archived configurations may be deleted under certain circumstances, the rescue configuration should be preserved. In yet another alternative, the reset configuration can be determined using some automated means. Rescue configuration 350 may have been loaded into second storage 330 by any of several entities, such as a network service provider, a centralized authority, or a user. In one embodiment, a user is an authorized user.

Rescue configuration 350 may be a fairly involved and detailed configuration. Alternatively, it may be a simple configuration sufficient to configure the apparatus so as to permit a service provider or some other remotely located expert to upload a more complex and complete configuration to the data forwarding apparatus. In one embodiment, rescue configuration 350 is sufficient to allow the data forwarding apparatus to be reachable (e.g., by a remote device or terminal). In addition, rescue configuration 350 may invoke an auto-install process for loading a valid configuration.

Although not shown, rescue configuration 350 may be stored on a different storage device than the one or more committed configurations. Indeed, rescue configuration 350 may be stored on a different type of storage device.

The rescue command may be initiated in a variety of ways, such as by a CLI, some other user interface, or simply a physical button or switch. If the rescue command is initiated by a physical button or switch located on the data forwarding apparatus, it may be desirable to locate it where it will not be selected inadvertently (e.g., on the rear of a rack mounted device, or as a flush mounted button on the front panel of a rack mounted device). The button may also be multi-functional. For example, pressing the button and releasing immediately (or within a certain period of time) may simply reboot the apparatus, while pressing and holding it down for a different period of time may cause the apparatus to perform a rescue operation. It may be desirable to make a rescue button or switch easy to find and identify so that a less experienced user can locate it easily, or with minimal assistance from a user at a remote location communicating via telephone or e-mail.

Figure 4:
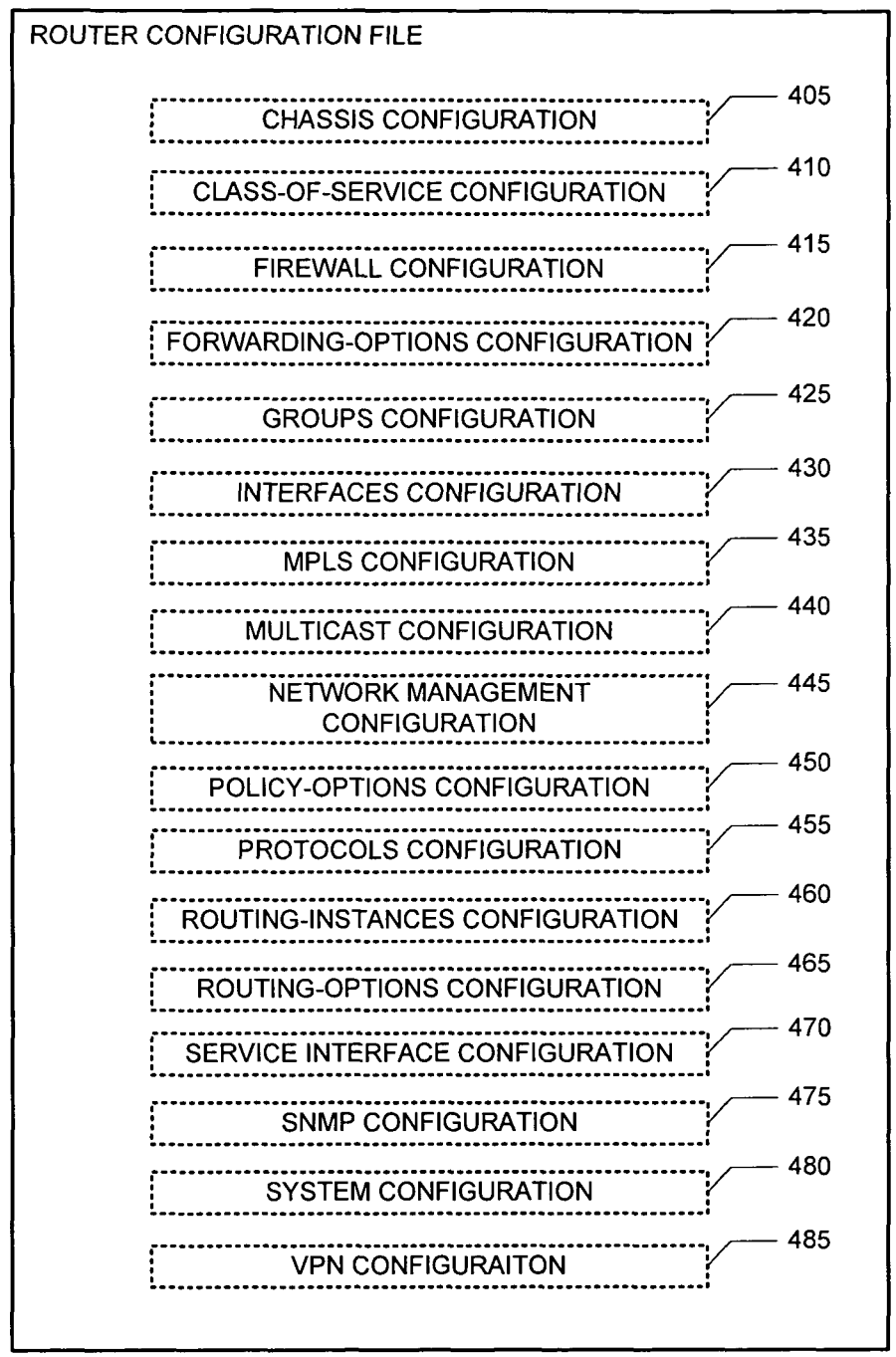
FIG. 4 is a block diagram that illustrates different types of configurations that may be used in a router configuration data structure.

Various types of current, committed and/or rescue configuration information may be stored. For example, FIG. 4 illustrates categories of exemplary configuration information 150 that may be used for configuring a router. The configuration categories may include one or more of: chassis configuration 405; class-of-service configuration 410; firewall configuration 415; forwarding options configuration 420; groups configuration 425; interfaces configuration 430; MPLS configuration 435; multicast configuration 440; network management configuration 445; policy-options configuration 450; protocols configuration 455; routing instances configuration 460; routing options configuration 465; service interface configuration 470; simple network management protocol (SNMP) configuration 475; system configuration 480; VPN configuration 485; etc.

§4.3.2 Exemplary Methods

Figure 5:
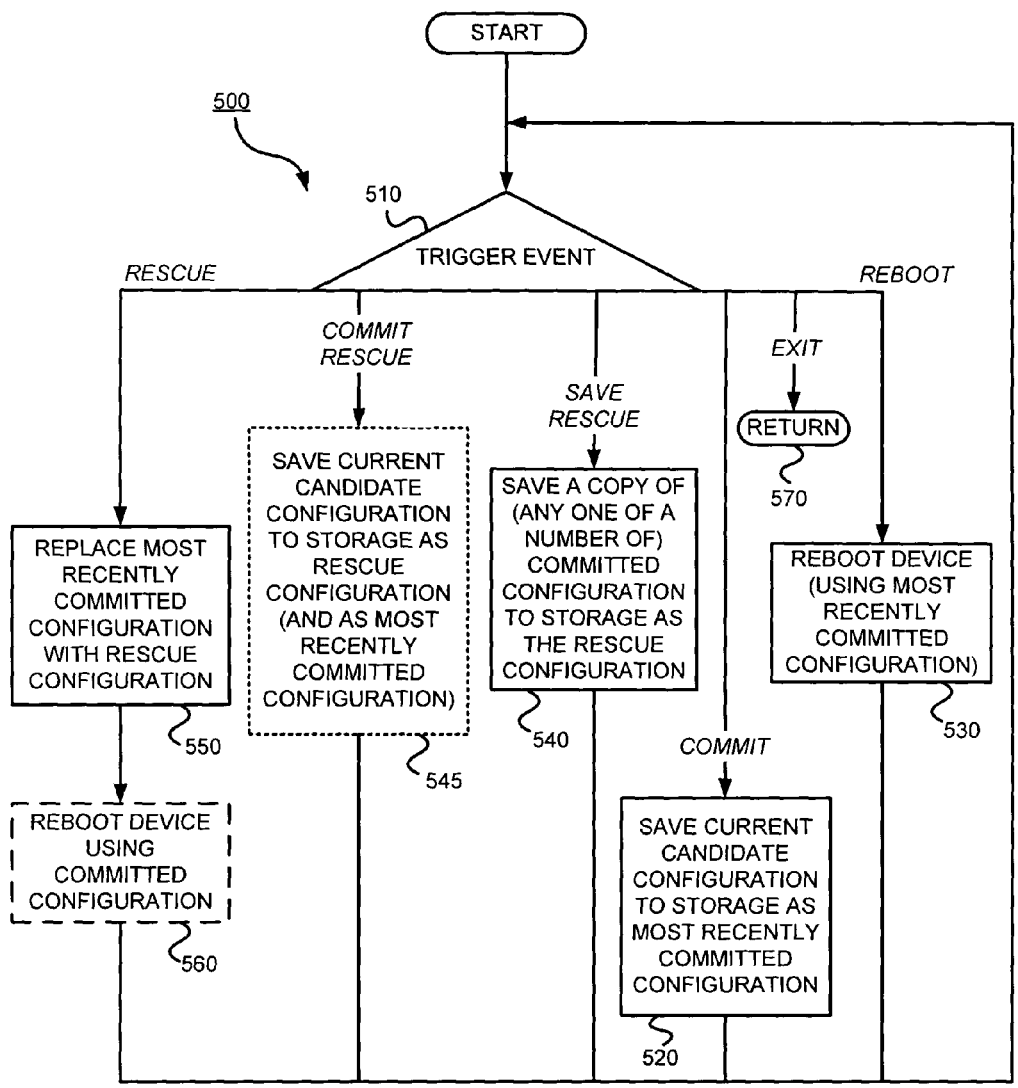
FIG. 5 is a flow diagram of an exemplary method that may be used to perform at least some operations in a manner consistent with principles of the invention.

FIG. 5 is a flow diagram of an exemplary method 500 that may be used to perform at least some operations in a manner consistent with principles of the invention. As shown, various branches of method 500 may be performed in response to various trigger events (Block 510). The trigger event may be a command. For example, in response to a "commit" command, the current candidate configuration is saved as the most recently committed configuration (Block 520) and method 500 branches back to Block 510. In response to a "reboot" command, the apparatus is rebooted using the most recently committed configuration (Block 530) before method 500 branches back to Block 510. In response to a "save rescue" command, a copy of a (e.g., the most recently) committed configuration may be saved as the rescue configuration (Block 540) before the method 500 branches back to Block 510. In an apparatus that permits multiple configurations to be committed, the copy saved may be any one of the configurations (e.g., any one of a number of revisions) committed. In response to a "commit rescue" command, the current candidate configuration (e.g., the configuration currently stored in non-persistent work memory) may be saved to persistent storage as the rescue configuration (Block 545) before method 500 branches back to Block 510. As indicated, the current candidate configuration may also be saved as the most recently committed configuration. (Block 545) The stored rescue configuration may be identified as such by storing it in a particular storage location, or flagging it in some way. In response to a "rescue" command, the most recently committed configuration may be replaced with the rescue configuration (e.g., the known functioning configuration) (Block 550) before method 500 branches back to Block 510. Recall from FIG. 3 that this may occur by (i) loading the rescue configuration into a first storage, and (ii) then committing the rescue configuration. In addition to replacing the most recently committed configuration with the rescue configuration in response to a "rescue" command, the apparatus may also be rebooted (Block 560). However, this act of rebooting the apparatus is usually not necessary and therefore need not be performed. If an "exit" command is entered, method 500 is left. (Node 570)

Although not shown, after rebooting the apparatus (Block 530 and 560), method 500 may be exited (Node 570), rather than branching back to Block 510.

In an alternative method, when a "rescue" command is entered, the apparatus may simply use the rescue (e.g., known functioning) configuration, without requiring that the rescue configuration first replace the most recently committed configuration. In yet another alternative method, when a "rescue" command is entered, the apparatus may automatically determine the known functioning configuration and use it to reboot the apparatus. In still another alternative, the apparatus may determine the known functioning configuration, to be used as the rescue configuration, even before the "rescue" command is entered. Since the "commit rescue" and "save rescue" commands produce a similar result, it is not necessary to support both commands.

The methods described above may be performed by, or used with, a single device. Alternatively, the methods described above (or steps thereof) may be performed by or used with multiple, perhaps distributed, devices.

§4.3.3 Exemplary Hardware Architectures

Figure 6:
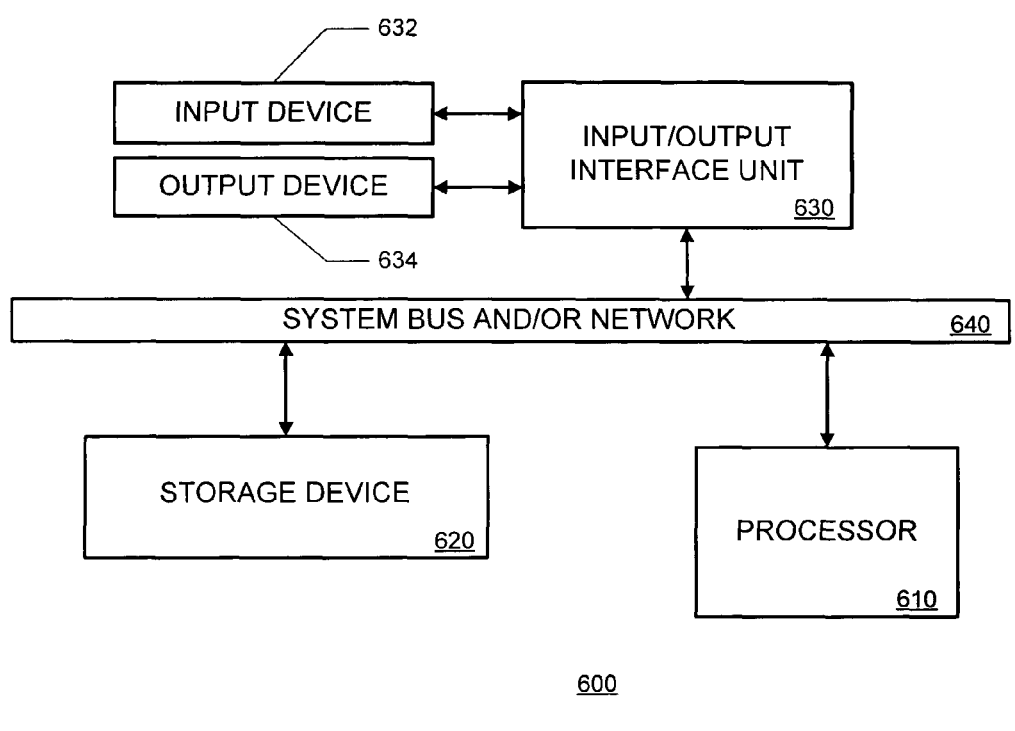
FIG. 6 is a block diagram that illustrates an exemplary machine that may be used to perform various operations of the invention, and to store various information generated and/or used by the invention.

FIG. 6 is a block diagram of a machine 600 which may be used to perform one or more of the operations, and to store the information described above. Machine 600 basically includes a processor 610, an input/output interface unit 630, a storage device 620, and a system bus and/or a network 640 for facilitating the communication of information among the coupled elements. An input device 632 and an output device 634 may be coupled with the input/output interface 630. Operations consistent with the principles of the invention may be performed by processor 610 executing instructions. The instructions may be stored in storage device 620 and/or received via input/output interface 630. The instructions may be functionally grouped into processing modules. Although not shown, more than one of some or all of the components may be provided.

Machine 600 may be a router, for example. In an exemplary router, processor 610 may include a microprocessor and/or (e.g., custom) integrated circuits. In the exemplary router, storage device 620 may include one or more of ROMs, RAMs, SDRAMs, SRAMs, SSRAMs, DRAMs, flash drives, hard disk drives and flash cards. At least some of storage devices 620 may include program instructions defining an operating system, a protocol daemon, and/or other daemons. In one embodiment, methods consistent with the principles of the invention may be performed by processor 610 executing the stored program instructions. At least a portion of the instructions may be stored (temporarily or more permanently) on storage device 620 and/or may be received from an external source via input interface unit 630. Finally, in the exemplary router, input/output interface unit 630, input device 632 and output device 634 may include interfaces to terminate communications links. Input device 632 may include a keyboard. Exemplary machine 600 may include other elements in addition to, or in place of, the elements illustrated in FIG. 6 without departing from the principles of the invention. For example, there could be one or more additional processors, imprint devices, storage devices, etc.

Although the elements are shown as being included in one device, functions and/or elements of the present invention may be distributed over two or more devices.

Naturally, the operations of the invention may be performed on systems other than data forwarding devices and on routers other than the exemplary router. Such other systems may employ different hardware and/or software.

§4.4 Conclusions

As can be appreciated from the foregoing, the principles of the invention permit even a user to reset an apparatus, such as a router, to a presumably valid configuration.

The forgoing description of embodiments consistent with the principles of the invention provides illustration and description, but is not intended to be exhaustive or to limit the invention to the precise from disclosed. Modifications and variations are possible in light of the above teachings or may be acquired from practice of the invention. For example, the order of the acts shown in FIG. 5 may differ in other implementations when the order of the acts are not dependent on each other. Further, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A data forwarding device comprising:
   a) a data forwarding facility for forwarding data using forwarding information;
   b) a route determination facility for determining the forwarding information;
   c) a storage device storing a plurality of committed configurations including
      1) a most recently committed configuration,
      2) a single previously identified rescue configuration, and
      3) a factory default configuration; and
   d) means for identifying, based on a user input, the single rescue configuration from among the plurality of committed configurations while the most recently committed configuration is known to be functioning,
   wherein the single rescue configuration is identified by a user as the single rescue configuration prior to receiving a rescue input from the user.

2. The data forwarding device of claim 1 further comprising:
   e) an input adapted to accept a rescue input, wherein in response to a rescue input, using the single rescue configuration for the data forwarding device.

3. The data forwarding device of claim 1 wherein the single rescue configuration includes at least one of (a) router chassis configuration information, (b) class-of-service configuration information, (c) firewall configuration information, (d) router forwarding options configuration information, (e) router interfaces configuration information, (f) MPLS configuration information, (g) multicast configuration information, (h) router protocols configuration information, (i) routing instances configuration information, (j) routing options configuration information, (k) SNMP configuration information, and (l) VPN configuration.

4. The data forwarding device of claim 1 wherein the single rescue configuration ensures that the data forwarding device is reachable.

5. The data forwarding device of claim 1 wherein the single rescue configuration ensures that the data forwarding device initiates an auto-install operation to install further configuration information from a remote source.

6. The data forwarding device of claim 1 wherein the single rescue configuration includes at least one of (a) class-of-service configuration information, (b) packet forwarding options configuration information, (c) routing protocols configuration information, (d) routing instances configuration information, and (e) routing options configuration information.

7. The data forwarding device of claim 1 wherein the single rescue configuration is a known functioning committed configuration.

8. The data forwarding device of claim 1 wherein the means for determining the single rescue configuration operates heuristically.

\* \* \* \* \*